(12) United States Patent
Crowther

(10) Patent No.: US 11,572,961 B2
(45) Date of Patent: Feb. 7, 2023

(54) STACKABLE PUMP AND VALVE COOLANT MODULES

(71) Applicant: Hanon Systems, Daejeon (KR)

(72) Inventor: David Crowther, Bloomfield Hills, MI (US)

(73) Assignee: HANON SYSTEMS, Daedeok-Gu (KR)

( * ) Notice: Subject to any disclaimer, the term of this patent is extended or adjusted under 35 U.S.C. 154(b) by 166 days.

(21) Appl. No.: 16/939,217

(22) Filed: Jul. 27, 2020

(65) Prior Publication Data

US 2022/0025985 A1   Jan. 27, 2022

(51) Int. Cl.
*F16K 27/00* (2006.01)
*F16K 11/044* (2006.01)

(52) U.S. Cl.
CPC .......... *F16K 27/003* (2013.01); *F16K 11/044* (2013.01)

(58) Field of Classification Search
CPC . F16K 27/003; F16K 27/063; B60Y 2410/10; F15B 13/0857; F15B 13/0803; F15B 13/0814; F15B 13/0889; F15B 13/0892; F15B 13/0885
See application file for complete search history.

(56) References Cited

U.S. PATENT DOCUMENTS

| | | | | | |
|---|---|---|---|---|---|
| 5,887,623 | A | * | 3/1999 | Nagai | G05D 16/2026 417/187 |
| 6,164,335 | A | * | 12/2000 | Hayashi | F15B 13/0828 137/884 |
| 6,170,527 | B1 | * | 1/2001 | Hayashi | F16K 27/003 137/884 |
| 10,180,191 | B2 | * | 1/2019 | Atkin | F16K 11/22 |

FOREIGN PATENT DOCUMENTS

| | | |
|---|---|---|
| JP | 2006512540 A | 4/2006 |
| KR | 102109973 B1 | 5/2020 |
| WO | 2011121739 A1 | 10/2011 |
| WO | 2015004646 A1 | 1/2015 |

* cited by examiner

*Primary Examiner* — Michael R Reid
(74) *Attorney, Agent, or Firm* — Shumaker, Loop & Kendrick, LLP; James D. Miller

(57) ABSTRACT

A module for a fluid circuit of a vehicle includes a unitary housing. The unitary housing of the module contains a fluid moving device, a fluid control device, and a power sharing connection. The power sharing device is configured to provide power to the fluid moving device and the fluid control device.

8 Claims, 3 Drawing Sheets

STACKABLE PUMP AND VALVE COOLANT MODULES

FIELD

The invention relates to coolant modules, and more particularly to stackable single unit modules each having a pump, valve, and electrical connection.

BACKGROUND

As known, many components are employed in vehicle heating and coolant systems such as pumps and valves providing flow to heat exchangers, engines, tanks, batteries, and other vehicle heating and cooling components. Additionally, mounting brackets, electrical connections and harnesses, and fluid hose connections begin to increase as the necessity for additional devices such as pumps and valves, for example, are employed in heating and cooling systems in a vehicle. The devices require electrical connections in order to provide power to the devices. However, as the requirement for more compact vehicle packaging and additional components persists, a complexity of assembly and maintenance is increased. With a more complex assembly and maintenance, costs are increased. Therefore, there is a desire to minimize complexity of the heating and cooling systems by consolidating components to maximize space.

It would therefore be desirable to provide a single unit module including a pump and a valve that facilitates a minimization of vehicle packaging space and process and maintenance complexity, wherein the module is capable of being easily electrically connectable to another module.

SUMMARY

In accordance and attuned with the instant disclosure, a single unit module including a pump and a valve that facilitates a minimization of vehicle packaging space and process and maintenance complexity, wherein the module is capable of being easily electrically connectable to another module has surprisingly been discovered.

According to an embodiment of the instant disclosure,
According to another embodiment of the disclosure,
According to yet another embodiment of the disclosure,

DRAWINGS

The above, as well as other objects and advantages of the invention, will become readily apparent to those skilled in the art from reading the following detailed description of an embodiment of the invention when considered in the light of the accompanying drawing which:

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

In respect of the methods disclosed, the steps presented are exemplary in nature, and thus, the order of the steps is not necessary or critical.

As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The present disclosure describes stackable modules including devices for moving and controlling flow of a fluid and electrical connections for providing power to the devices for moving and controlling the flow of the fluid. The fluid may be configured as a cooling fluid in a coolant loop or circuit in a vehicle, for example.

Figure 1:
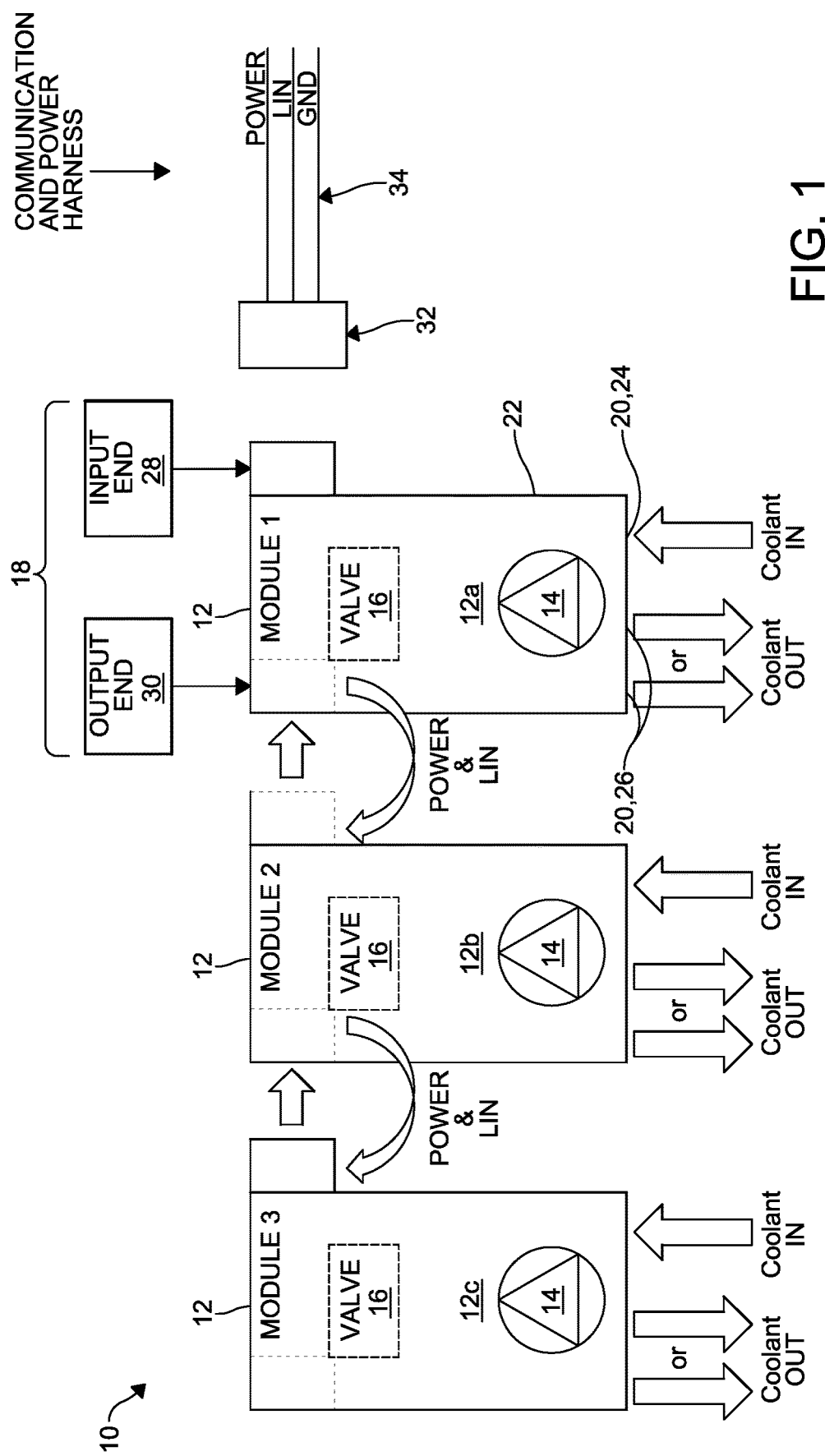
FIG. 1 is a schematic diagram of a stackable module assembly according to an embodiment of the present disclosure.

FIG. 1 shows a stackable module assembly 10 according to an embodiment of the present disclosure. The stackable module assembly 10 is configured for use in a cooling circuit such as an engine cooling circuit or an air conditioning circuit of a vehicle, for example. However, it is understood, the stackable module assembly 10 may be employed in other cooling circuits for other applications as desired.

The assembly 10 includes a plurality of modules 12. Each of the modules 12 includes a flow device 14, a valve 16, and a power sharing connection 18. The flow device 14 is a pump or compressor, for example. However, the flow device 14 can be an alternate device that causes a fluid to flow in a direction. As illustrated, the valve 16 is a three-way valve having three ports 20 for receiving or conveying fluid to or from a fluid circuit (not shown). However, the valve 16 can be any valve such as a two-way valve having two ports for receiving or conveying fluid or a four-way valve having four ports for receiving or conveying fluid. The valve 16 is electrically powered. However, it is understood, the valve 16 can be air powered, hydraulically powered, or otherwise powered as desired. In the embodiment illustrated, the valve 16 is in communication with the power sharing connection 18.

The power sharing connection 18 in the embodiment shown is a single electrical power sharing connection 18.

The term "single" as used herein and referring to the power sharing connection 18 means the power sharing connection 18 is the only, not more than one, power sharing connection on each of the modules 12 and there are not any other power sharing connections. The single electrical power sharing connection 18 facilitates consolidation of components and maximization of vehicle packaging space. However, it is understood, in alternate embodiments, not shown, if desired, the modules can include more than one of the electrical power sharing connection 18.

The flow device 14, the valve 16, and the power sharing connection 18 are contained in a single module housing 22. The term "single" as used herein and referring to the module housing 22 means the flow device 14, the valve 16, and the power sharing connection 18 are contained in the same housing and not separate housings, wherein the flow device 14, the valve 16, and the power sharing connection 18 can be transported together in the housing 22 as a singular unit and installed into the fluid circuit.

Each of the modules 12 includes a fluid inlet 24 for receiving a fluid from the fluid circuit and fluid outlets 26 for conveying the fluid to the fluid circuit. The flow device 14 causes the fluid to flow in and out of the modules 12 through the inlet 24 and outlets 26.

The power sharing connection 18 includes an input end 28 and an output end 30. The input end 28 couples to a power source 32. The power source 32 may be a power circuit 34 of the vehicle or the output end 30 of the power sharing connection 18 of an adjacent one of the modules 12. The power circuit 34 includes a power connection, a ground connection (GND), and a local interconnect network (LIN) connection for providing communication of the modules 12 between components in the vehicle. The output end 30 of the power sharing connection 18 provides power to the input end 28 of an adjacent one of the modules 12. Each of the power sharing connections 18 includes an LIN connection line and a power connection line providing communication between the modules 12 and the power source 32.

The plurality of modules 12 includes a first module 12a, a second module 12b, and a third module 12c. However, it should be understood, the plurality of modules 12 can include more than or fewer than three modules, if desired. The first module 12a is adjacent the power circuit 34 and the housing 22 of the first module 12a and the power sharing connection 18 of the first module 12a are configured for direct coupling to the power circuit 34. The second module 12b is adjacent the first module 12a and the housing 22 of the second module 12b is directly coupled to the housing 22 of the first module 12a. The power sharing connection 18 of the second module 12b is directly coupled to the output end 30 of the first module 12a. The third module 12c is adjacent the second module 12b and the housing 22 of the third module 12c is directly coupled to the housing 22 of the second module 12b. The power sharing connection 18 of the third module 12c is directly coupled to the output end 30 of the second module 12b.

Figure 2:
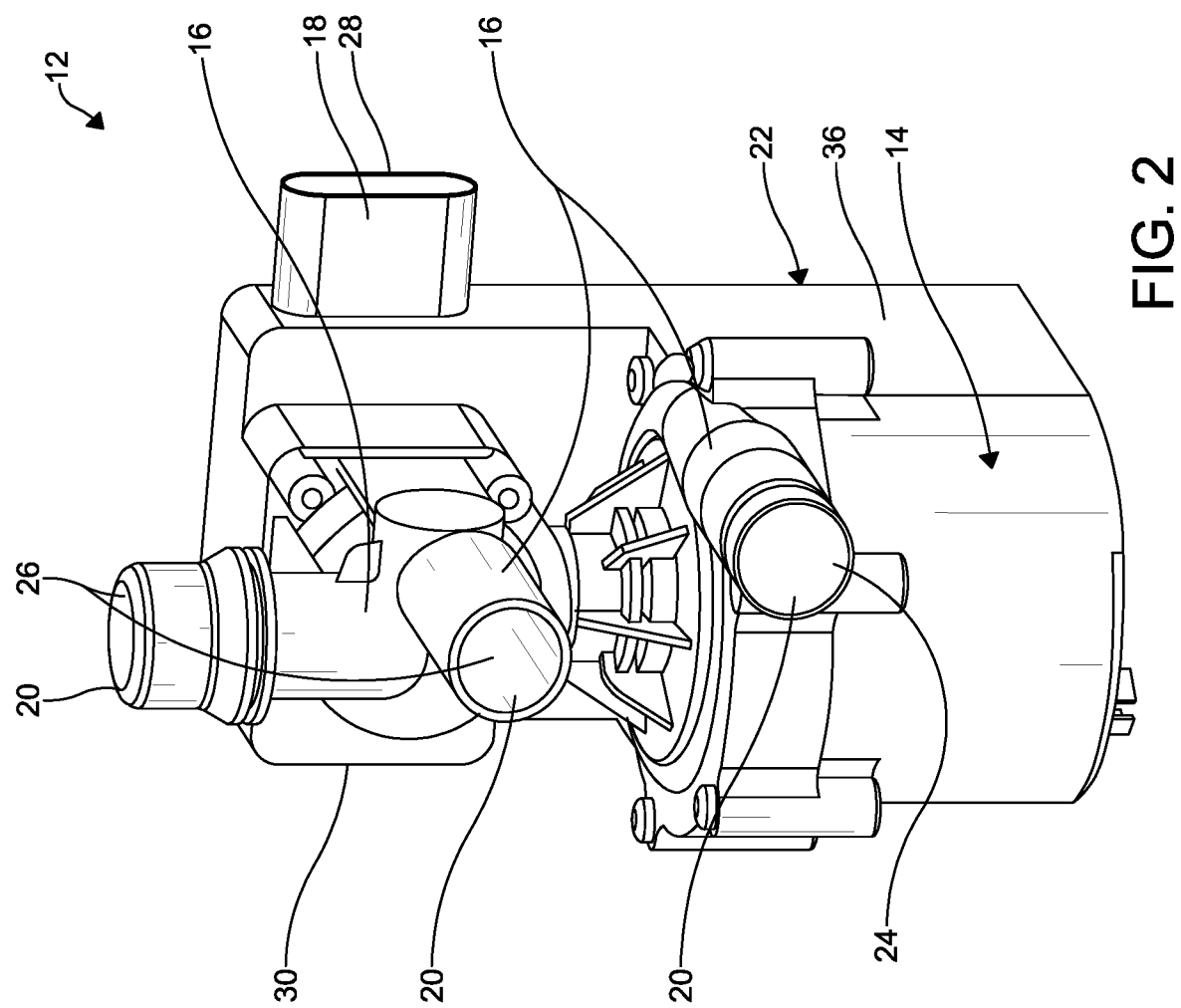
FIG. 2 is a front perspective view of a module of the stackable module assembly of FIG. 1.

FIG. 2 illustrates a module 12 according to an embodiment of the disclosure. As illustrated, the module 12 includes the flow device 14, the valve 16, and the power sharing connection 18 enclosed in the housing 22. The module 12 is one unitary module 12. The lower portion of the housing 22 encloses the flow device 14. The valve 16 is configured as a three-way valve. However, it is understood the valve 14 can be a two-way valve or four-way valve, if desired. The valve 14 can include any number of the ports 20 as desired. Additionally, while the illustration shows the arrangement of the fluid inlet 24 adjacent the flow device 14 and the fluid outlets 26 adjacent an upper portion of the module 12, it is understood the fluid outlets 26 can be fluid inlets and the fluid inlet 24 can be a fluid outlet and the arrangements of the fluid inlets 24 and the fluid outlets 26 can be positioned with respect to the housing 22 as desired depending on the application of the fluid circuit.

As shown, the input end 28 of the power sharing connection 18 is configured as a male connection wherein a portion of the input end 28 extends outwardly from the housing 22 for connecting to a female connection of the power source 32 or a female connection of an adjacent one of the modules 12. The output end 30 of the power sharing connection 18 is configured as a female connection for connection to the male connection of the power sharing connection 18 of an adjacent one of the modules 12. It is understood the input end 28 and the output end 30 can be configured otherwise, as desired.

The housing 22 can be formed from a plastic or metal material from a molding process, for example. The housing 22 can be formed monolithically or as separate portions coupled together to form the unitary housing 22 (as shown). In the illustrated embodiment, a portion of the housing 22 containing the valve 14 is couple to a portion of the housing 22 containing the flow device 14 and to a portion of the housing 22 containing the power sharing connection 18. The housing 22 may also contain a built in engine control unit (ECU) or a printed circuit board assembly (PCBA) as indicated at a rear portion 36 of the housing 22. The ECU or PCBA communicates the power sharing connection 18 to the flow device 14 and valve 16 and ultimately to the power source 32.

Figure 3:
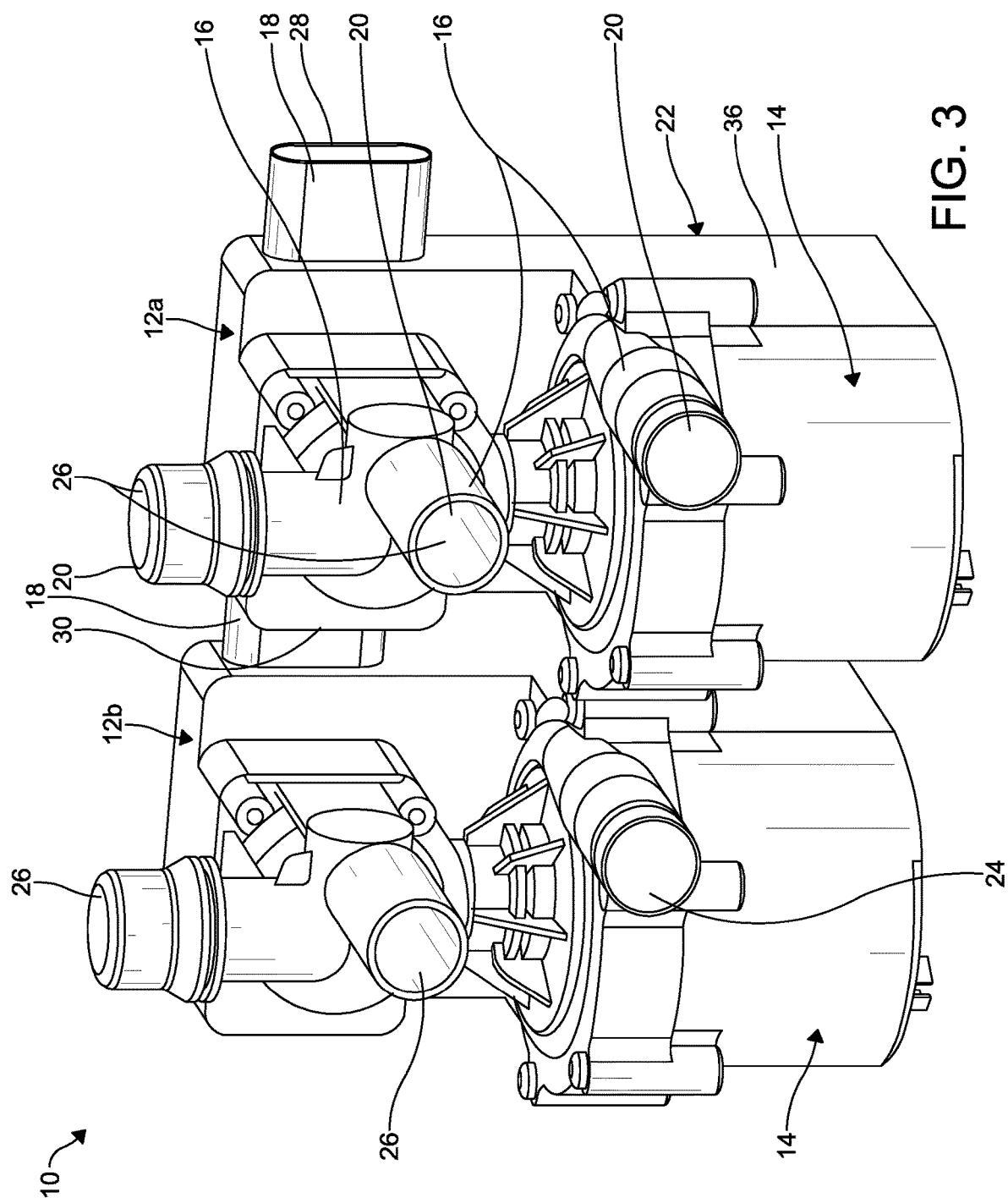
FIG. 3 is a front perspective view of a pair of the modules of FIG. 2, wherein the modules are coupled to each other.

FIG. 3 illustrates a pair of the modules 12 coupled to each other. It is understood, more than two modules can be coupled together, if desired and as indicated earlier herein. As shown, the output end 30 of the first module 12a is coupled to the input end 28 of the second module 12b. The first module 12a is then configured for connection to the power source 32. As a result, power and LIN connections can be shared between the modules 12a, 12b.

In application, the modules 12 can be used to consolidate valves and flow devices. For example, the first module 12a can be used in a first branch of the fluid circuit, the second modules 12b can then be coupled to the first module 12b, wherein the second modules in used in a second branch of the fluid circuit. The third modules 12c can be coupled to the second modules 12b, wherein the second module 12b is used in a third branch of the fluid circuit. The modules 12a, 12b, 12c all share the same electrical connection without employing extra hoses, conduits, electrical line connections, and the like. Therefore, a consolidation of devices in the fluid circuit is realized. It is understood, the modules 12a, 12b, 12c can also me employed in portions of the same branch of the fluid circuit. For example, instead of a branch of the fluid circuit having a valve separate from a flow device and each of the valve and the flow device having separate electrical connections and conduits, the branch of the fluid circuit has the modules 12a with the consolidated valve 16 and the flow device 14 sharing power from the power sharing connection 18. Additionally, the second module 12b can share the power from the power sharing connection 18 of the first module 12a so additional electrical connections and conduits not have to be employed for each of the flow devices 14 and the valves 16 of each of the modules 12a, 12b. The additional modules 12, such as the third module 12c, can also be combined with the modules 12a, 12b to consolidated connections.

Advantageously, according to the invention of the disclosure, devices (the flow device 14, the valve 16, and the power sharing connection 18) can be combined into a unitary one of the modules 12. As a result, the modules 12 can share power between each other instead of having separate power connections for each one of the devices. In application, package size of vehicle components can be minimized since the modules 12 create more efficient use of space. Additionally, the inclusion of hoses or circuit branches can be minimized to minimize cost and assembly time. Complexity of maintenance can also be reduced as less components need replaced or taken apart.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A stackable module assembly comprising:
    a unitary first module including a first single power sharing connection, a first flow device, a first valve, a first fluid inlet, and a pair of first fluid outlets, wherein the first flow device is configured to cause a fluid to flow in a direction from the first fluid inlet towards the pair of the first fluid outlets, and wherein the first valve is configured to determine a distribution of the fluid flowing from the first fluid inlet to each of the respective first fluid outlets; and
    a unitary second module including a second single power sharing connection, a second flow device, a second valve, a second fluid inlet, and a pair of second fluid outlets, wherein the unitary second module is coupled to the unitary first module, wherein the second flow device is configured to cause the fluid to flow in a direction from the second fluid inlet towards the pair of the second fluid outlets, and wherein the second valve is configured to determine a distribution of the fluid flowing from the second fluid inlet to each of the respective second fluid outlets.

2. The stackable module assembly of claim 1, wherein the first single power sharing connection includes an input end and an output end and the second single power connection includes an input end and an output end, wherein the output end of the first single power sharing connection is in contact with the input end of the second single power sharing connection.

3. The stackable module assembly of claim 2, wherein the input end of the first single power sharing connection is in contact with a power source.

4. The stackable module assembly of claim 2, wherein the output ends of each of the first single power sharing connection and the second single power sharing connection is configured as female connections and the input ends of each of the first single power sharing connection and the second single power sharing connection is configured as a male connection.

5. The stackable module assembly of claim 1, further comprising a third unitary module including a third single power sharing connection, a third flow device, and a third valve, wherein the third unitary module is coupled to the second module.

6. The stackable module assembly of claim 1, wherein each of the first unitary module and second unitary module include at least one of an engine control unit or a printed circuit board assembly.

7. The stackable module assembly of claim 1, wherein the first flow device is disposed adjacent the first inlet at a first end of the unitary first module and the first valve is disposed adjacent the pair of the first outlets at a second end of the unitary first module, and wherein the second flow device is disposed adjacent the second inlet at a first end of the unitary second module and the second valve is disposed adjacent the pair of the second outlets at a second end of the unitary second module.

8. The stackable module assembly of claim 1, wherein the first inlet and the pair of the first outlets fluidly couple the unitary first module to an external fluid circuit, wherein the second inlet and the pair of the second outlets fluidly couple the unitary second module to the external fluid circuit, and wherein the external fluid circuit conveys the fluid therethrough.

* * * * *